United States Patent
Won et al.

(10) Patent No.: US 10,312,971 B2
(45) Date of Patent: Jun. 4, 2019

(54) METHOD AND APPARATUS FOR COOPERATIVE COMMUNICATION IN WIRELESS COMMUNICATION SYSTEM

(71) Applicant: Samsung Electronics Co., Ltd, Gyeonggi-do (KR)

(72) Inventors: Sung Hwan Won, Gyeonggi-do (KR); Beomsik Bae, Gyeonggi-do (KR); Sangsoo Jeong, Gyeonggi-do (KR); Songyean Cho, Seoul (KR); Gyouhwan Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/763,122

(22) PCT Filed: Jul. 21, 2014

(86) PCT No.: PCT/KR2014/006607
§ 371 (c)(1),
(2) Date: Jul. 23, 2015

(87) PCT Pub. No.: WO2015/009130
PCT Pub. Date: Jan. 22, 2015

(65) Prior Publication Data
US 2016/0119037 A1    Apr. 28, 2016

(30) Foreign Application Priority Data

Jul. 19, 2013  (KR) .................. 10-2013-0085647
Feb. 7, 2014   (KR) .................. 10-2014-0014337
(Continued)

(51) Int. Cl.
*H04B 7/06*    (2006.01)
*H04L 5/00*    (2006.01)
(Continued)

(52) U.S. Cl.
CPC .......... *H04B 7/024* (2013.01); *H04B 7/0619* (2013.01); *H04B 7/0626* (2013.01);
(Continued)

(58) Field of Classification Search
CPC .... H04B 7/024; H04B 7/0619; H04B 7/0626; H04W 36/34; H04W 24/10; H04L 5/0073
See application file for complete search history.

(56) References Cited

U.S. PATENT DOCUMENTS 9,270,345 B2 *  2/2016  Koivisto ................ H04B 7/024
9,591,655 B2 *  3/2017  Hammarwall ....... H04J 11/0053
(Continued)

FOREIGN PATENT DOCUMENTS

KR   10-2013-0008468 A    1/2013
WO   WO 2012/047005 A2    4/2012
(Continued)

OTHER PUBLICATIONS

International Search Report dated Nov. 27, 2014 in connection with International Patent Application No. PCT/KR2014/006607, 9 pages.
(Continued)

*Primary Examiner* — Ivan O Latorre

(57) ABSTRACT

A method for a cooperative communication according to a portion of the present specification, may include receiving at least one of information related to a radio access point and information related to a user equipment (UE) receiving a service from the radio access point, from the radio access point. The receiving may be performed by using a User Datagram Protocol (UDP) and a General Packet Radio Service (GPRS) Tunneling Protocol (GTP).

12 Claims, 5 Drawing Sheets

(30) Foreign Application Priority Data

Apr. 24, 2014 (KR) ........................ 10-2014-0049269
Jun. 11, 2014 (KR) ........................ 10-2014-0071095

(51) Int. Cl.
  *H04B 7/024* (2017.01)
  *H04W 24/10* (2009.01)
  *H04W 36/34* (2009.01)

(52) U.S. Cl.
  CPC ........... *H04W 24/10* (2013.01); *H04W 36/34* (2013.01); *H04L 5/0073* (2013.01)

(56) References Cited

U.S. PATENT DOCUMENTS

| | | | |
|---|---|---|---|
| 2012/0076038 A1 | 3/2012 | Shan et al. | |
| 2012/0099470 A1* | 4/2012 | Li | H04B 7/024 370/252 |
| 2013/0021929 A1* | 1/2013 | Kim | H04B 7/024 370/252 |
| 2013/0053078 A1 | 2/2013 | Barbieri et al. | |
| 2013/0155973 A1* | 6/2013 | Geirhofer | H04B 7/0632 370/329 |
| 2013/0165122 A1 | 6/2013 | Tanaka | |
| 2013/0190011 A1 | 7/2013 | Kim et al. | |
| 2013/0223272 A1* | 8/2013 | Tao | H04B 7/024 370/252 |
| 2013/0303167 A1* | 11/2013 | Zhu | H04W 76/048 455/436 |
| 2014/0044061 A1* | 2/2014 | Yue | H04W 72/042 370/329 |
| 2014/0073313 A1* | 3/2014 | Hammarwall | H04B 7/0626 455/422.1 |
| 2014/0204871 A1* | 7/2014 | Ode | H04B 7/024 370/329 |
| 2014/0274102 A1* | 9/2014 | Manssour | H04L 1/0026 455/453 |
| 2014/0274160 A1* | 9/2014 | Xiao | H04W 64/00 455/456.5 |
| 2014/0293914 A1* | 10/2014 | Maattanen | H04W 72/1278 370/329 |
| 2015/0263836 A1 | 9/2015 | Kim | |
| 2016/0105903 A1* | 4/2016 | Hessler | H04W 72/1231 455/450 |

FOREIGN PATENT DOCUMENTS

| | | |
|---|---|---|
| WO | WO 2012062166 | 5/2012 |
| WO | WO 2012067403 A2 | 5/2012 |
| WO | 2013/012281 A2 | 1/2013 |
| WO | WO 2013/066204 A1 | 5/2013 |

OTHER PUBLICATIONS

Written Opinion of International Searching Authority dated Nov. 27, 2014 in connection with International Patent Application No. PCT/KR2014/006607, 6 pages.

Extended European Search Report issued for EP 14827029.1 dated Dec. 3, 2015, 8 pgs.

Office Action dated Sep. 4, 2018 in connection with Chinese Patent Application No. 201480005875.9, 16 pages.

* cited by examiner

[Fig. 4]
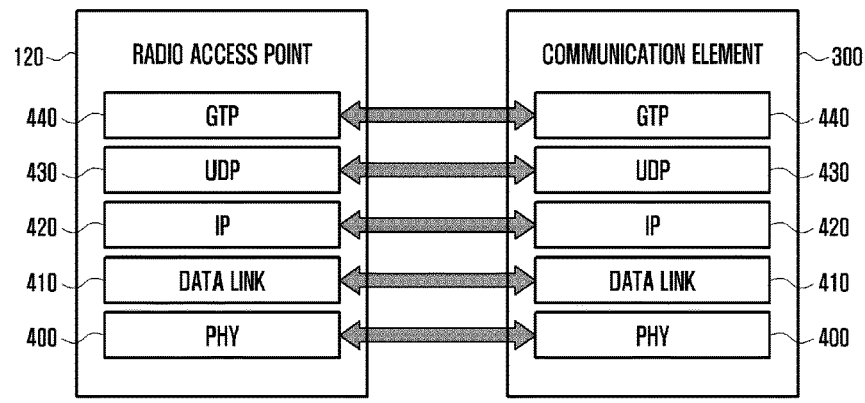
[Fig. 5a]
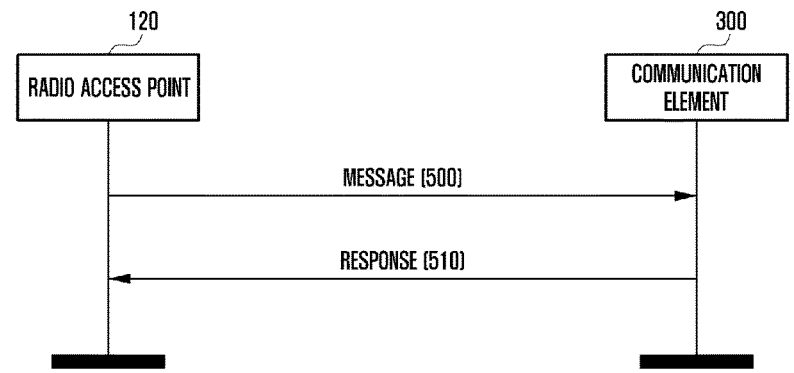
[Fig. 5b]
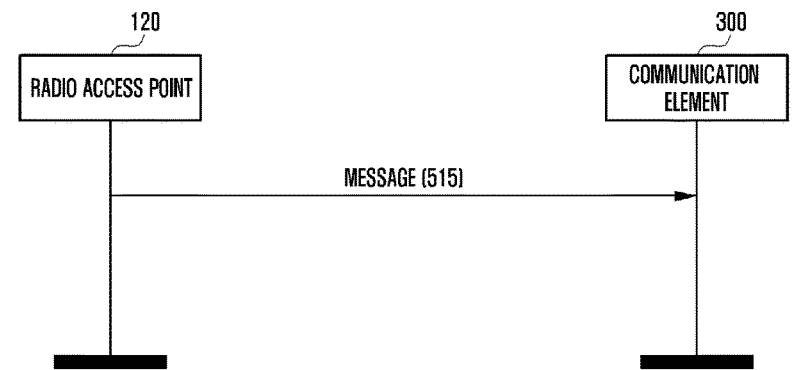
[Fig. 5c]
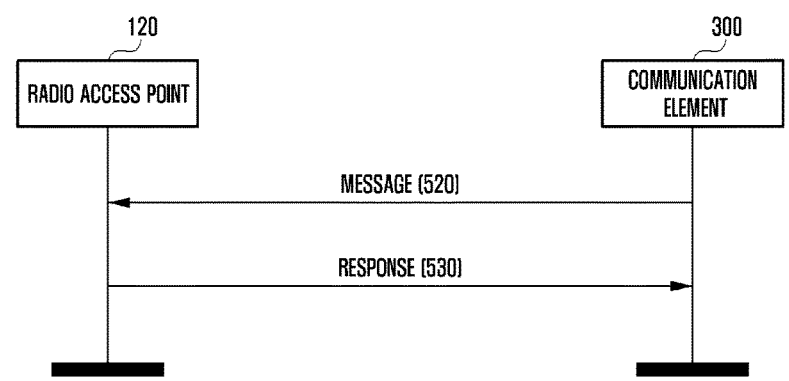

[Fig. 5d]
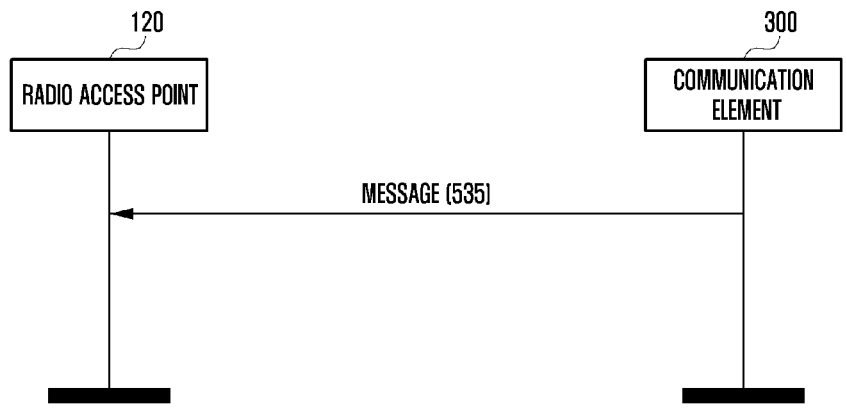
[Fig. 6]
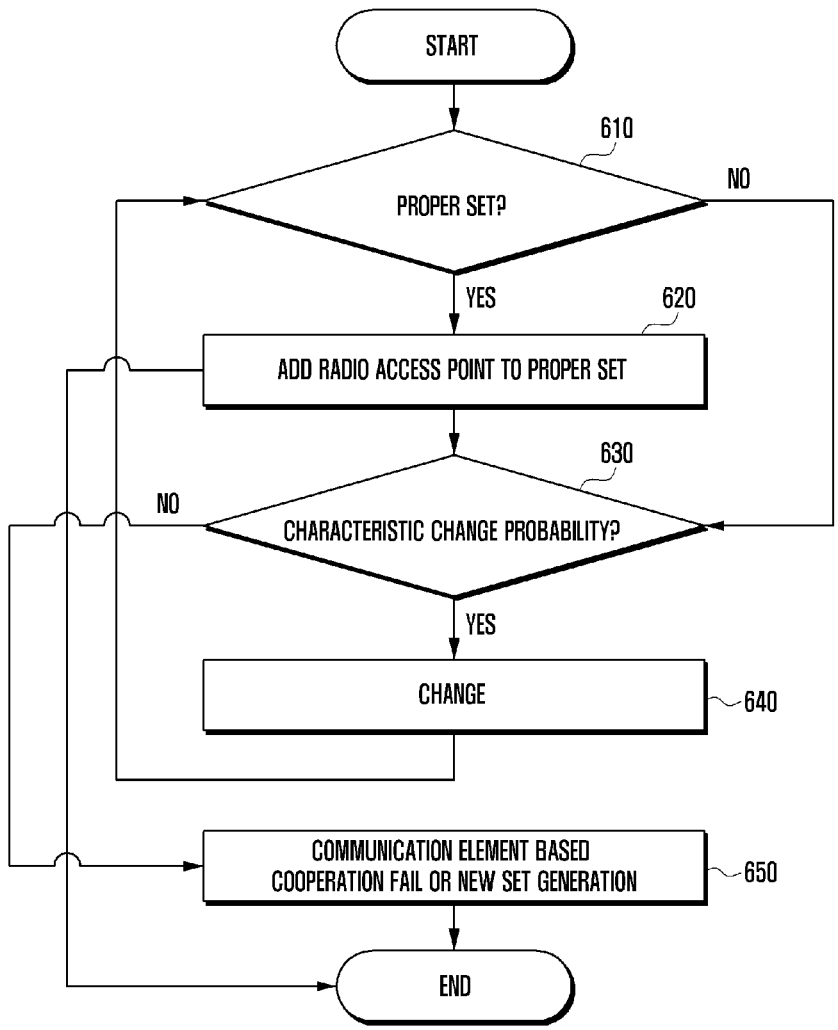

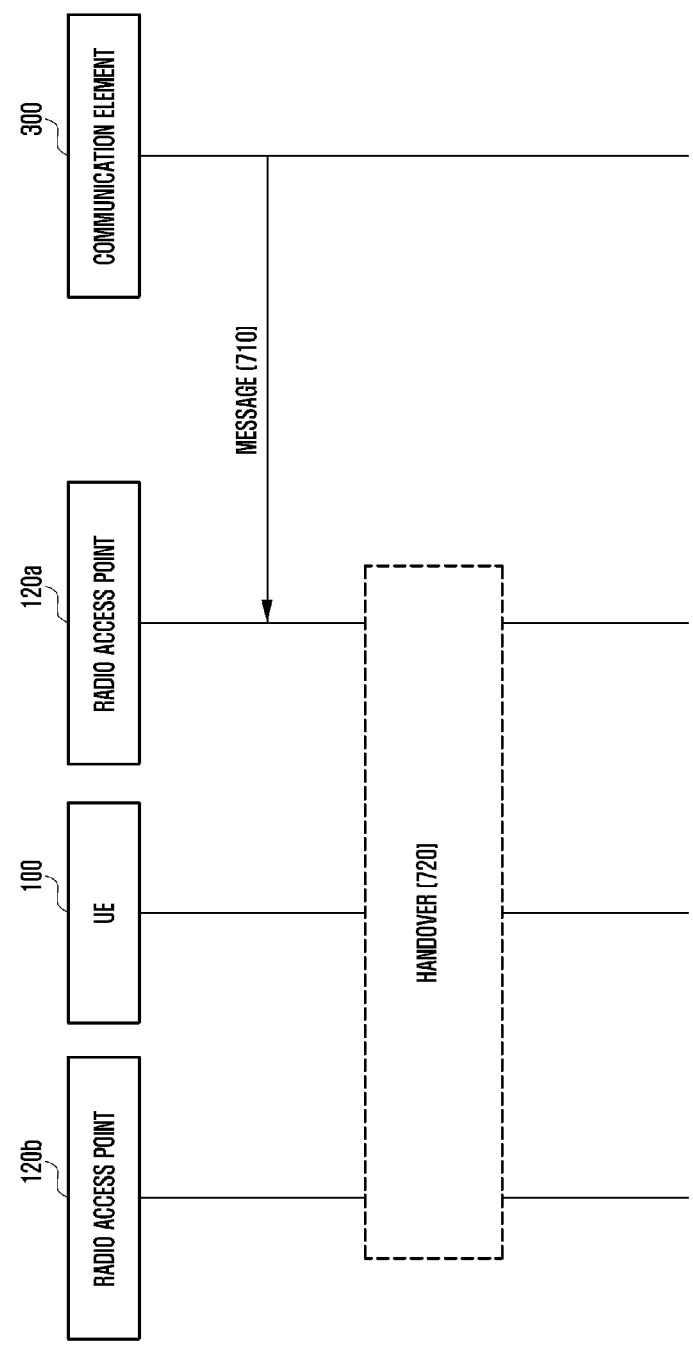
[Fig. 7]

[Fig. 8]
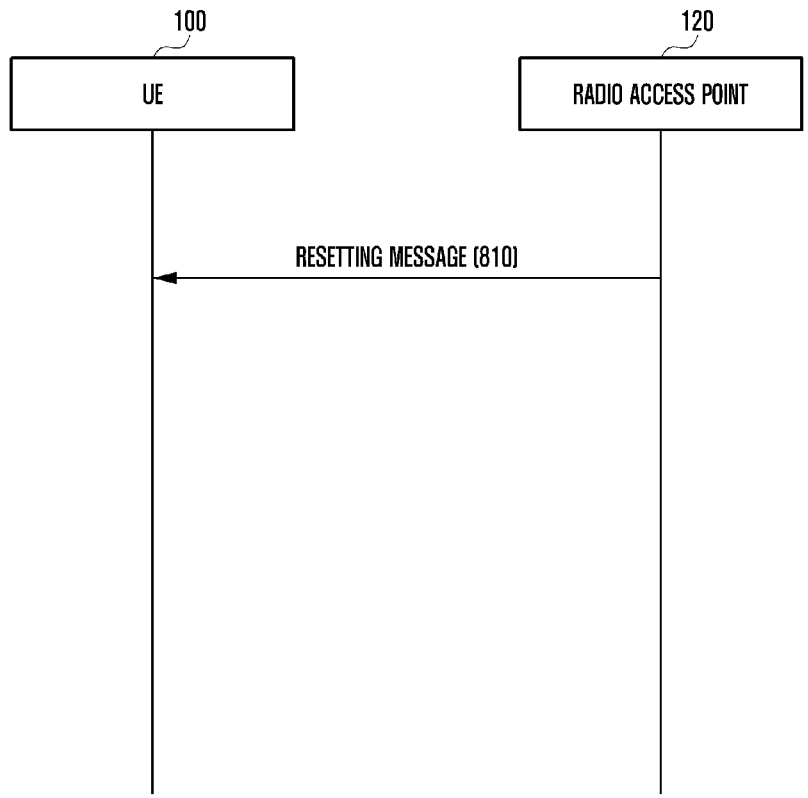
[Fig. 9]
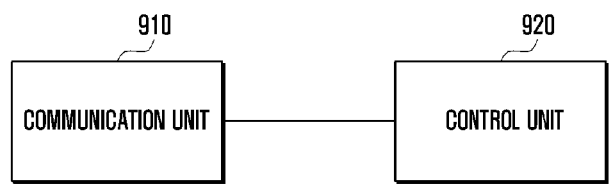
[Fig. 10]
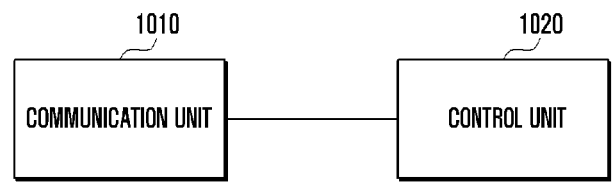
[Fig. 11]
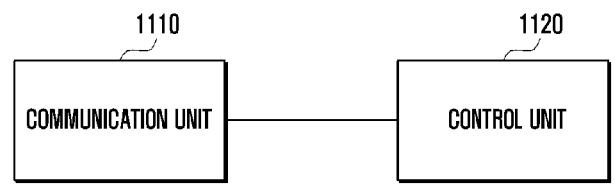

METHOD AND APPARATUS FOR COOPERATIVE COMMUNICATION IN WIRELESS COMMUNICATION SYSTEM

CROSS-REFERENCE TO RELATED APPLICATION(S)

The present application claims priority under 35 U.S.C. § 365 to International Patent Application No. PCT/KR2014/006607 filed Jul. 21, 2014, entitled "METHOD AND APPARATUS FOR COOPERATIVE COMMUNICATION IN WIRELESS COMMUNICATION SYSTEM". International Patent Application No. PCT/KR2014/006607 claims priority under 35 U.S.C. § 365 and/or 35 U.S.C. § 119(a) to Korean Patent Application Nos. 10-2013-0085647 filed Jul. 19, 2013, 10-2014-0014337filed Feb. 7, 2014, 10-2014-0049269 filed Apr. 24, 2014, and 10-2014-0071095 filed Jun. 11, 2014, and which are incorporated herein by reference into the present disclosure as if fully set forth herein.

TECHNICAL FIELD

The present invention relates to a method and an apparatus for a cooperative communication in a wireless communication system.

BACKGROUND ART

An early wireless communication system has been developed to provide voice services while ensuring the mobility of users. In addition, the wireless communication system has been expanded from the voice service to a data service. In recent years, the wireless communication system has been developed to provide a high-speed data service.

FIG. 1 illustrates a configuration of a wireless communication system. Referring to FIG. 1, the wireless communication system may include a terminal (may be referred to as a User Equipment (UE)) 100, a Radio Access Network (RAN) 130 and a core network 140.

The RAN 130 may include a plurality of configuration elements. A configuration element 120 of the RAN interacting with the UE 100 may communicate with the UE 100 through a wireless interface 110. Remaining elements of the wireless communication system may be connected with each other by wires. For example, the RAN configuration element 120 interacting with the UE 100 through the wireless interface 110 may include a portion of an evolved Node B (eNB), a Node B (NB), a Radio Network Subsystem (RNS) including the NB, a Base Transceiver Station (BTS), a Base Station Subsystem (BSS) including the BTS, a wireless access point, a home eNB, a home NB, a home eNB GateWay (GW) and an X2 GW. In the present specification, for convenience, the RAN configuration element is referred to as at least one of the examples of the RAN configuration element 120 described above by using a term of radio access point, or is referred to as the RAN 130.

The radio access point 120 may include at least one cell. The cell controls a specific area, and the UE 100 receives a service in an area of the cell. Here, the cell means a cell of a cellular system, and the radio access point 120 means a device managing and controlling the cell. But, in the present specification, for convenience, the cell and the radio access point 120 may have the same meaning. The cell and the radio access point 120 may be mixed in describing one object (e.g. an exemplary embodiment), according to convenience.

The core network 140 may include a RAN control entity 135. The RAN control entity 135 takes charge of overall control functions such as a mobility management, an certification, a security, and the like. For example, the RAN control entity 135 may include a portion of a Mobility Management Entity (MME) and a Serving General Packet Radio Service (GPRS) Support Node (SGSN).

Because the radio access point 120 provides the service to the UE 100 through the wireless interface 110, each of the radio access points 120 has a coverage suitable for providing the service.

DISCLOSURE OF INVENTION

Technical Problem

At least a portion of an exemplary embodiment of the present invention relates to implementing a cooperative communication of a plurality of radio access points.

Solution to Problem

The method for cooperative communication according to the exemplary embodiment of the present specification, may include receiving at least one of information related to a radio access point and information related to a user equipment (UE) receiving a service from the radio access point, from the radio access point. The receiving may be performed by using a User Datagram Protocol (UDP) and a General Packet Radio Service (GPRS) Tunneling Protocol (GTP).

Advantageous Effects of Invention

According to at least the portion of the exemplary embodiment of the present specification, configuration elements of a wireless communication system may cooperatively communicate, and a load between radio access points may be adjusted based on the cooperation.

BRIEF DESCRIPTION OF DRAWINGS

FIG. 4 is a view illustrating a protocol stack applied to the interface 310 between the communication element 300 and the radio access point 120;

FIGS. 5A to 5D are flowcharts illustrating a process wherein a message is transferred between the radio access point 120 and the communication element 300 according to an exemplary embodiment of the present invention;

FIG. 6 is a flowchart illustrating a process of forming a set of a cooperative radio access point according to the second exemplary embodiment of the present specification;

FIG. 7 is a flowchart illustrating a handover process according to a seventh exemplary embodiment of the present specification;

FIG. 8 is a flowchart illustrating a process wherein the radio access point 120 changes setting information of the UE 100;

FIG. 9 is a block diagram illustrating the UE 100 according to at least a portion of an exemplary embodiment of the present specification;

FIG. 10 is a block diagram illustrating the radio access point 120 according to at least a portion of an exemplary embodiment of the present specification; and FIG. 11 is a block diagram illustrating the communication element 300 according to at least a portion of an exemplary embodiment of the present specification.

MODE FOR THE INVENTION

Figure 1:
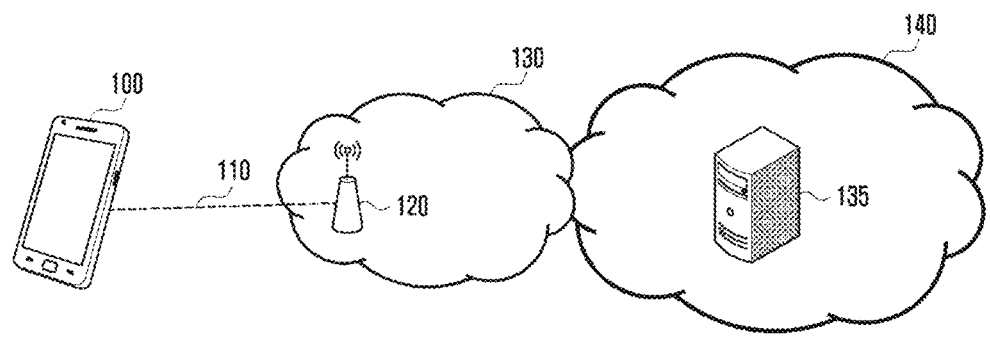
FIG. 1 illustrates a configuration of a wireless communication system.

Hereinafter, exemplary embodiments of the present invention will be described in detail with reference to the accompanying drawings. Hereinafter, exemplary embodiments of the present invention will be described in detail with reference to the accompanying drawings. It is noted that, where possible, the same reference numerals are designated to the same components in the accompanying drawings. Further, in the following description of the present invention, a detailed description of known functions and configurations incorporated herein will be omitted when it may make the subject matter of the present invention rather unclear.

Further, although the following description of embodiments of the present disclosure will be directed to a wireless access network based on the 3rd Generation Partnership Project (3GPP) standard, and Long Term Evolution (LTE) and Evolved Packet Core (EPC) that are core networks, it can be understood by those skilled in the art that the main gist of the present invention may also be applied to any other communication system having the similar technical background and channel format, with a slight modification, without substantially departing from the scope of the present invention.

Figure 2:
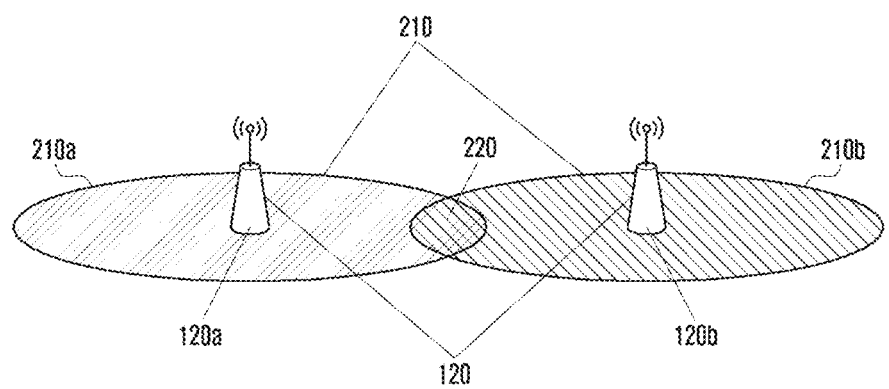
FIG. 2 is a mimetic diagram illustrating an overlap of coverage.

FIG. 2 is a mimetic diagram illustrating an overlap of coverage.

Referring to FIG. 2, adjacent general two radio access points 120a and 120b have coverages 210a and 210, respectively. At this time, there may be an overlap area 220 of the two coverages 210a and 210b. A User Equipment (UE) 100 located in the overlap area 220 may receive a strong interference by a signal of at least one of the two radio access points 120a and 120b. For example, when the UE 100 receives a service in the radio access point 120a, the UE 100 may receive the strong interference due to the radio access point 120b.

In FIG. 2, the radio access points 120a and 120b have similar areas of the coverages 210. But, a situation considered in the present invention is not limited thereto. In addition, a situation where the coverage 210a of the radio access point 120a is included in the coverage 210b of the radio access point 120b, a situation where coverages of at least three radio access points are overlapped, and other various situations where the interference is generated due to the overlapped coverage 220 may be considered.

In addition, the overlapped coverage 220 may incur a frequent signaling as well as the interference between the radio access points 120. For example, the frequent signaling may include a signaling related to a hand over.

The system may turn on or off each of the radio access points 120, or may control a transmission power for an energy saving of the radio access point 120. A case wherein any area is not included in all radio access points is not a preferable case, and thus a particular attention may be needed when the system turns on or off the radio access point 120 or controls the transmission power.

In order to resolve the problems (e.g. the problem of the energy saving and so on) generated owing to the above-mentioned problem (i.e. the overlapped coverage 220), recently, 3rd Generation Partnership Project (3GPP) has been developing a technique wherein the plurality of radio access points 120 cooperatively communicate with each other. As an example of such a technique, there are a Coordinated Multi-Point transmission and reception (CoMP) technique, a carrier aggregation, etc.

Figure 3:
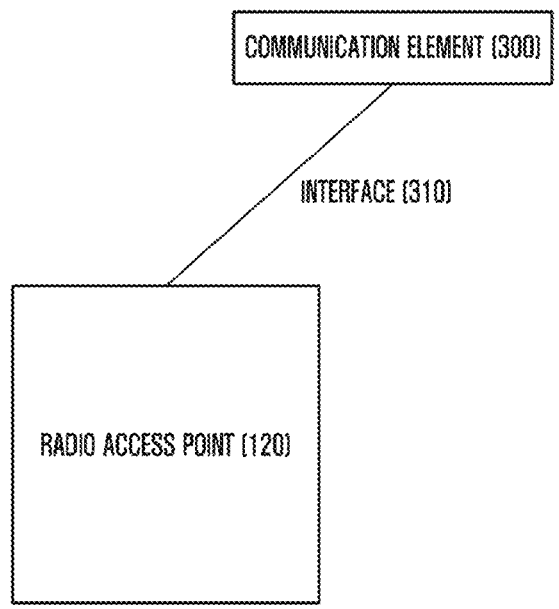
FIG. 3 is a configuration diagram of a network including a radio access point 120 according to an exemplary embodiment of the present specification.

FIG. 3 is a configuration diagram of a network including the radio access point 120 according to an exemplary embodiment of the present specification.

In order to control the above problems and the energy saving problem generated due to the overlapped coverage described with reference to FIG. 2, it may be necessary for each of two or more radio access points to transmit or receive information related to the radio access point and the UE receiving the service from the radio access points to or from other radio access points. Also, because there are several other radio access points around the one radio access point 120, it is preferable that each of the radio access points transmits or receives the information related to comparatively many radio access points and UE served from the radio access points.

FIG. 3 illustrates a proper structure wherein each of the radio access points transmits or receives the information related to the comparatively many radio access points and UE served from the radio access points. A communication element 300 is connected to at least one radio access point 120. A number of the radio access point 120 may be changed according to a process capacity of the communication element 300. A proper interface 310 may be used for the corresponding connection. For example, the communication element 300 may perform at least one role among following roles.

A role of receiving at least one of the information related to the radio access point and the information (e.g. channel status information measured at a reference signal resource and/or an interference measurement resource and reported by the UE) related to the UE served by the radio access point, through the interface 310 from the at least one radio access point;

A role of transmitting at least one of information (e.g. cooperation information) related to another radio access point and information related to a UE served by another radio access point, through the interface 310 from the at least one radio access point.

The communication element 300 may perform a cooperative communication between the radio access points 120, or may provide information considered in scheduling of the radio access point 120, based on the above-mentioned role performance.

The communication element 300 may include a predetermined element and may include a new element not known until now. For example, the predetermined element may include at least one of the MME, the SGSN, a Radio Network Controller (RNC), an Evolved Serving Mobile Location Centre (E-SMLC), the radio access point and an Operations, Administration and Management (OAM). When the communication element 300 corresponds to the radio access point, all operations performed on the radio access point 120 by the communication element 300 described in the exemplary embodiment of the present invention may be operations performed on the communication element 300 by the radio access point 120. In the same manner, all operations performed on the communication element 300 by the radio access point 120 may be the operations performed on the radio access point 120 by the communication element 300, the operation performed by the communication element 300 may be performed by the radio access point 120, and the operation performed by the radio access point 120 may be performed by the communication element 300.

The proper interface 310 may be changed according to the communication element 300. For example, when the communication 300 element 300 is the radio access point, the interface 310 may be an X2 interface. When the communication element 300 is the new element, the interface 310 may also be a new interface.

In addition, when the communication element 300 is implemented with one radio access point, in order to definitely classify roles of the communication element 300 and another radio access point 120, a network configuration may be needed. That is, when the communication element 300 is also the radio access point, the network configuration may request a superior environment.

FIG. 4 is a view illustrating a protocol stack applied to the interface 310 between the communication element 300 and the radio access point 120.

A User Datagram Protocol (UDP) layer 430 layer may be applied on a physical layer 400, a data link layer 410 and an Internet Protocol (IP) layer 420. A GPRS Tunneling Protocol (GTP) may be applied on the UDP layer.

For a reliable data transmission, a Stream Control Transmission Protocol (SCTP) layer may be applied instead of the UDP layer 430. When the UDP layer 430 is applied and the communication element 300 is the radio access point, the interface 310 may be a user plane X2 interface (X2-U) or the new interface rather than the X2 interface.

The SCTP may provide a multi homing environment and strength with respect to a packet loss, but in order to provide these advantages, an implementation complexity is comparatively high. Because of such an implementation complexity, it may be difficult to implement the SCTP with a Digital Signal Processing (DSP) chip. In general, an SCTP packet may be processed by using a Linux kernel, when the Linux kernel is used, a calculation amount is large, and thus it is difficult to implement the SCTP packet. In contrast, the UDP which may be implemented with a comparatively simple DSP chip may be proper to transmit data to be transmitted in real time, rather than the SCTP.

The GTP layer 440 is an example of an Application Protocol (AP) layer. The AP layer may be properly named according to a name of the interface 310. For example, when the interface 310 is the X2 interface, the AP may be referred to as an X2-AP. In addition, for example, when the interface 310 is the new interface, the AP may be referred to as {name of the new interface}-AP. When the UDP layer 430 is applied, the GPRS Tunneling Protocol (GTP) may be applied as the AP layer. A message encoding manner of the AP layer may have a work aligned structure having a common header for a simple implementation. As another example of the message encoding manner of the AP layer, an ASN.1 manner may be used.

For the cooperation between the radio access points, a number of the interfaces which transmit or receive the information related to the radio access point or the information related to the UE 100 may be two or more. For example, when the communication element 300 is the radio access point 120, partial information for the cooperation may be transferred through an X2-C interface, and remaining information may be transferred through an X2-U interface. In this case, comparatively frequently transferred information may be transferred through the X2-U interface, and the remaining information may be transferred through the X2-C interface. Although another interface is considered rather than the X2 interface because the communication element 300 is not the radio access point, the comparatively frequently transferred information may be transferred through an interface based on the UDP, and the remaining information may be transferred through the SCTP interface.

For the cooperation between the radio access points, when the interface which transmits or receives the information related to the radio access point or the UE 100 is the X2-U, it may be necessary to expand a use of the X2-U interface so that the X2-U interface may be used for another purpose in addition to a function of a data forwarding which is currently defined.

In the above, the structure capable of transmitting and receiving the information related to the radio access point and the UE 100, and the protocol stack of the interface used in transmitting and receiving the information are specifically illustrated through FIGS. 3 and 4.

FIGS. 5A to 5D are flowcharts illustrating a process wherein a message is transferred between the radio access point 120 and the communication element 300 according to an exemplary embodiment of the present invention. Hereinafter, in the present specification, FIGS. 5A to 5D are referred to as FIG. 5.

A message flow shown in FIG. 5 may mean a transfer through an AP message, or may mean a transfer through a payload portion or a message expansion (e.g. a header expansion) of a GTP message. When a header of a GTP packet is expanded, a complexity may be expressed through a fourth bit currently left over as an extra bit (an eighth bit is located a left end), or may be expressed through a new expanded header. The method of expressing the complexity by generating the new expanded header in the GTP packet header may be a more proper method because a great space capable of storing information is secured by generating the new expanded header.

In FIGS. 5A and 5B, a case wherein the message transfer process is started from the radio access point 120 is shown.

Referring to FIG. 5A, the radio access point 120 transmits the message to the communication element 300 in step 500. The communication element 300 may transmit a response message 510 responding to the message in step 500 to the radio access point 120 in step 510. The response message (step 510) may be a message related to a success or may be a message informing of a failure.

Referring to FIG. 5B, the radio access point 120 transmits the message to the communication element 300 in step 515, but the communication element 300 may not transmit the response message. The process in FIG. 5B may be referred to as a process formed with one message (step 515).

In FIGS. 5C and 5D, the message transfer process of a case wherein the message transfer process is started from the communication element 300 is shown.

Referring to FIG. 5C, the communication element 300 transmits the message to the radio access point 120 in step 520. The radio access point 120 may transmit the response message to the communication element 300 in response to the message of step 520, in step 530. The response message (step 530) may be the message related to the success or may be the message informing of the failure.

Referring to FIG. 5D, the communication element 300 transmits the message to the radio access point 120 in step 535, but the radio access point 120 may not transmit the response message. The process in FIG. 5D may be referred to as the process formed with one message (step 535).

Hereinafter, a first exemplary embodiment of the present specification is described.

According to the first exemplary embodiment of the present specification, data (or simple information related to a characteristic) having a unit of a required application may be exchanged between the radio access point 120 and the communication element 300 through a setup process. The radio access point 120 may initiate the setup process or the communication element 300 may initiate the setup process, as described with reference to FIGS. 5A to 5D.

When the radio access point 120 initiates the setup process, the radio access point 120 may transmit the message (step 500) requesting the setup to the communication element 300. The message (step 500) may include at least one of an identifier (ID) of the radio access point 120, an ID capable of identifying a subsystem of the radio access point 120, subsystem information of the radio access point 120, neighbor information of the subsystem of the radio access point 120.

Table 1 shows an example of the message (step 500) according to the first exemplary embodiment of the present specification.

TABLE 1

| Information Element (IE)/Group Name | Range |
|---|---|
| Global eNB ID | |
| Served Cells | 0 . . . <maxCellineNB> |
| >Cell Information | |
| >Neighbor Information | 0 . . . <maxnoofNeighbours> |
| >>Cell Information | |

In the present specification, the subsystem of the radio access point 120 may mean the cell or a Transmission Point TP or a sub-cell which are concepts subdivided more than the cell. In general, and in order to separate the cell, an ECGI or a PCI is used, in order to separate the TP or the sub-cell which are the concepts subdivided more than the cell, a proper number of bit may be newly added to the ECGI or the PCI.

The subsystem of the radio access point 120 may include at least one information included in a served cell Information Element (IE) defined in the X2-AP. The neighbor information of the subsystem of the radio access point 120 may include the at least one information included in the served cell Information Element (IE) defined in the X2-AP. For example, the served cell IE may include a subframe assignment IE indicating uplink-downlink configuration in a TDD manner. In the exemplary embodiments of the present invention, the subframe assignment IE and the uplink-downlink configuration may be mixed.

Subsystem information of the radio access point 120 may include at least one of Reference Signal (RS) setting information, Interference Measurement Resource (IMR) setting information, location information, Relative Narrowband Transmit Power (RNTP) IE and Almost Blank Subframe (ABS) information. In the exemplary embodiments, for example, the RS may include at least a portion of a Sounding RS (SRS), a Cell-specific RS (CRS), a Channel-State Information RS (CSI-RS) and a Demodulation RS (DMRS).

In the exemplary embodiments, the RS setting information may mean assignment information of the RS. In more specifically, for example, the RS setting information may include at least one of bandwidth information, frequency location information, time location information, antenna port information, cyclic shift information, a configuration index, transmission combination information, a portion or whole of a CQI-ReportConfig, a portion or whole of CSI-RS-Config, a portion or whole of CSI-RS-ConfigNZP, a portion or whole of CSI-RS-ConfigNZPld, a portion or whole of CSI-RS-ConfigZP, a portion or whole of CSI-RS-ConfigZPld, a portion or whole of DMRS-Config, and a portion or whole of SoundingRS-UL-Config of the RS. Alternatively, the RS information may include one or more information included in the above-mentioned information.

In the exemplary embodiments, time setting information may be used for synchronizing a time of the radio access point 120, and for example, the time setting information may include at least one of a system frame number offset, a subframe number offset, a reference time. The location information may include information related to a geographical or topological location of the radio access point 120 or the subsystem of the radio access point 120. In the exemplary embodiments, an IMR setting information may include CSI Interference Measurement (CSI-IM) resource setting information. The IMR setting information may include at least one of a CSI-IM-Config and CSI-IM-ConfigId. For example, the ABS information may include at least one of an ABS IE and an ABS Status IE. In the above description, the setting information may include assignment information.

The communication element 300 may transmit a setup response message (step 510) in response to a setup request message (step 500). The response message (step 510) may include an ID of the communication element 300. The response message may further include the served cell IE related to the cell controlled by the communication element 300.

When the communication element 300 initiates the setup process, the setup request message (step 500) and the setup response message (step 510) may correspond to the message (step 530) and the message (step 520), respectively. That is, in this case, the setup request message (step 530) may include information equal to or similar to the setup response message (step 510) in the case wherein the radio access point 120 initiates the setup process in the first exemplary embodiment, and the setup response message (step 520) may include information equal to or similar to the setup request message (step 500) in the case wherein the radio access point 120 initiates the setup process in the first exemplary embodiment.

The communication element 300 may store the transferred information related to the radio access point 120 and use the information related to the radio access point 120 in the cooperation or resource systematization between the radio access points. The radio access point 120 also may store the information related to the communication element 300 transferred from the communication element 300 and use the information related to the communication element in the cooperation or the resource systematization between the radio access points.

When a whole or a portion among the information transmitted or received in the process of the setup is changed, the changed information may be transmitted or received through a setting renewal process.

Next, a second exemplary embodiment of the present specification is described.

FIG. 6 is a flowchart illustrating a process of forming a set of the cooperative radio access point according to the second exemplary embodiment of the present specification.

According to the second exemplary embodiment of the present specification, the communication element 300 may form the set of the radio access point 120 to be cooperated based on the information of the radio access point 120, and to this end, the communication element 300 may properly change a characteristic of the radio access point 120.

The communication element 300 may determine whether there is a proper set where the radio access point 120 is included in step 610. To this end, the communication element 300 may collect the information related to the characteristic of the radio access point 120. The information collection may be performed through the setup or the setting renewal process described through the first exemplary embodiment.

The determination of step 610 may be determined by using at least one reference. For example, the communication element 300 may include the radio access point 120 in a set of the radio access points, comparatively closer to the radio access point 120, among currently existing sets of the radio access point, with reference to the location information of the radio access point 120. Besides, at least one of the exchanged information during the setup process or the setting renewal process may be the reference.

When it is determined that there is the proper set where the radio access point 120 is included in step 610, step 620 may be performed, and in contrast, when it is determined that there is not the proper set where the radio access point 120 is included in step 610, step 630 may be performed.

The communication element 300 may include the radio access point 120 in the proper set in step 620 and end the process.

Meanwhile, the communication element 300 may determine whether there is a changeable characteristic among the characteristics (nature or configuration) of the radio access point 120. Among the characteristics of the radio access point 120, there may be the characteristic changeable through a simple communication between the communication element 300 and the radio access point 120, and there may be a characteristic in which a change is not allowed.

When there is the changeable characteristic among the characteristics of the radio access point 120, step 640 may be performed, and when there is not the changeable characteristic among the characteristics of the radio access point 120, step 650 may be performed. At this time, when it is determined whether step 640 is performed or step 650 is performed, the communication element 300 may consider additional items in addition to determining whether there is the changeable characteristic. For example, as a result of the determination of the communication element 300, when there is the changeable characteristic among the characteristics of the radio access point 120, and it is preferable to change such a characteristic in the cooperative communication between the radio access point 120, step 640 may be performed. For example, as the result of the determination of the communication element 300, in a case wherein a Time Division Duplex (TDD) radio access point 120 is changed to a Frequency Division Duplex (FDD) radio access point 120, when the cooperative communication between the radio access points is performed more smoothly by adding to an existing radio access point set (i.e. the set of the radio access point operated with the FDD), the change may be promoted through step 640. A frequent performance of the characteristic change such as the conversion between the TDD and the FDD, which is a base of the radio access point 120, described above example, may be inefficient, and thus a careful consideration may be needed prior to the conversion performance.

The communication element 300 may instruct the radio access point 120 so as to change the characteristic of the radio access point 120, or request the conversion to the radio access point 120 in step 640. In another manner, the communication element 300 and/or the radio access point 120 may transmit information related to the characteristic of itself to be changed. The conversion instruction, conversion request and/or conversion informing may be performed through the message (step 520 or step 535) transferred through the interface 310 between the communication element 300 and the radio access point 120. The message (step 520 or step 535) may include an object of the change. For example, the object of the change may include at least one of the RNTP IE, the ABS information, an uplink (UL) high interference IE, the subframe assignment IE (in general, it may be referred to uplink-downlink configuration information in the TDD manner in addition to the simple subframe assignment IE), the RS setting information, and the IMR setting information (i.e. the CSI-IM Config or a subsystem of the CSI-IM Config).

As it is guessed from an example of the object of the change, a certain level of the cooperation between the radio access points may also be performed through the conversion process performed in step 640. For example, the communication element 300 may attempt the cooperation with a radio access point adjacent to the radio access point 120 by controlling a signal strength transmitted from a specific Physical Resource Block (PRB) of the radio access point 120 by instructing or requesting the change of the RNTP IE of the radio access point 120.

The conversion process may be performed according to the process shown in FIG. 5C or FIG. 5D. In the case of the FIG. 5C, the radio access point 120 may inform of a success or failure of the conversion to the communication element 300. In addition, according to the description of the present specification, the conversion process, that is, step 640, may be independently performed without relation to other steps.

More specifically, for example, a case wherein the subframe assignment IE is changed is described. For the cooperation between the radio access points using the TDD manner, a systematization with respect to when a downlink (DL) signal is transmitted and when an uplink (UL) signal is received is essential. Thus, when a setting of transmitting and receiving the DL signal and the UL signal is not ideal, the subframe assignment IE of the radio access point 120 may be changed. The radio access point 120 and/or the communication element 300 changing a value of the subframe assignment IE, more generally, the radio access point 120 and/or the communication element 300 changing an UL-DL configuration may inform UL-DL configuration information to be used to the other party. The communication element 300 and/or the radio access point 120 receiving the UL-DL configuration information may store the UL-DL configuration information and use the UL-DL configuration information in the cooperation or resource systematization between the radio access points.

Besides, when the radio access point 120 uses a plurality of transmission frequency domains, enabling the radio access point 120 not to use an improper transmission frequency domain may be an example of changing the characteristic of the radio access point 120.

When the communication element 300 requests and/or instructs to change at least one of the RS setting information and the IMR setting information, since the RS setting information and the IMR setting information may be information set with respect to the UE 100, it may be necessary to include the ID of the UE 100. In addition, the radio access point 120 receiving the message (step 520 or step 535) requesting or instructing the change at least one of the RS setting information and the IMR setting information may change setting information of the UE 100.

FIG. 8 is a flowchart illustrating a process wherein the radio access point 120 changes the setting information of the UE 100. The radio access point 120 transmits a resetting message to the UE 100. The resetting message may include instruction information which requests performing at least one of a changing, an adding and a deleting of at least one of the RS setting information and the IMR setting information. For example, the message 810 may include an RRC-ConnectionReconfiguration message. The RS setting information and the IMR setting information may be transferred through a physicalConfigDedicated IE of the message 810. The UE 100 receiving the message 810 resets a physical channel setting suitably to the transferred information.

After performing step 640, the communication element 300 may determine whether there is the proper set where the radio access point 120 is included in step 610.

The radio access point 120 may determine that the radio access point 120 is not proper to perform the cooperation between the radio access points through the communication element 300, or may generate a new radio access point set in which the radio access point 120 is included, in step 650. Next, the process is ended.

Next, a third exemplary embodiment of the present specification is described.

According to the third exemplary embodiment of the present specification, the radio access point 120 may transfer a context with respect to the UE 100 served by the radio access point 120 to the communication element 300. The third exemplary embodiment may also be performed according to at least one of the signal flows shown in FIGS. 5A, 5B and 5C.

In case of the signal flow shown in FIG. 5A, the radio access point 120 may transmit the message (step 500) transferring the context with respect to the UE served by the radio access point 120 to the communication element 300. For example, the context with respect to the UE transferred through the message may include at least one of an UE radio capability IE, a portion of information included in the UE radio capability IE, a Closed Subscriber Group (CSG) membership status IE, bearer information of the UE 100, a UE Aggregate Maximum Bit Rate (UE-AMBR) and area restriction information. In addition, the message may further include an ID for identifying the UE by the radio access point 120.

The communication element 300 may transmit the response message (step 510) informing of a successful reception of the context with respect to the UE 100 to the radio access point 120 in response to the message (step 500). When problems are generated, the message (step 510) may include a message informing a generation of an abnormal situation. The process may be performed through an eNB configuration update process or an X2 setup process. The message (step 510) may include at least one of an ID for identifying the UE 100 by the communication element 300 and an ID for identifying the UE by the radio access point 120.

In the case of the signal flow shown in FIG. 5B, a whole or portion of the information included in the above-mentioned message (step 500) may be transferred through the message (step 515) of FIG. 5B. The message (step 515) may include the ID for identifying the UE by the radio access point 120.

In the case of the signal flow shown in FIG. 5C, the communication element 300 may transmit the message (step 520) requesting the transfer of the context with respect to the UE 100 served by the radio access point 120. The communication element 300 may transmit the message (step 530) transferring the context with respect to the UE 100 in response to the message (step 520).

The communication element 300 may store the transferred context with respect to the UE 100 and use the context with respect to the UE 100 in the cooperation or resource systematization between the radio access points.

When a whole or a portion among the information transmitted or received in the process of transferring the context with respect to the UE 100 to the communication element 300 is changed, the changed information may be transmitted or received through a context renewal process of the UE 100. The radio access point 120 may transmit at least one of the ID for identifying the UE 100 by the communication element 310 and the ID for identifying the UE 100 by the radio access point 120, and a changed context or a whole context of the UE 100 identified by the ID. The communication element 300 receiving the information may renew the existing context with respect to the UE 100 according to the received information. The communication element 300 may transmit a message informing of a result (i.e. success or failure) of the renewal. The message informing of the result may include at least one of the ID for identifying the UE 100 by the communication element 300 and the ID for identifying the UE by the radio access point 120.

In addition, a release process may be started in order to release the context with respect to the UE 100 stored in the communication element 300. In the release process, the radio access point 120 may transfer at least one of the ID for identifying the UE 100 by the communication element 300 and the ID for identifying the UE by the radio access point 120. The communication element 300 receiving the ID in the release process may release the context with respect to the UE 100 corresponding to the ID.

Next, a fourth exemplary embodiment of the present specification is described.

According to the fourth exemplary embodiment of the present specification, the radio access point 120 may transfer channel information and other necessary information of the UE 100 served by the radio access point 120 to the communication element 300.

The fourth exemplary embodiment may be performed according to the signal flow shown in FIG. 5A or FIG. 5B.

The channel information of the UE 100 is changed comparatively fast according to a time. Therefore, it may be necessary to transmit the channel information of the UE 100 frequently. The message transmitted to the communication element 300 from the radio access point 120 is essentially transmitted, but the transmitting the response message (step 510), responding to the message, from the communication element 300 to the radio access point 120 each time may be inefficient.

Thus, performing according to the signal flow shown in FIG. 5B wherein the communication element 300 does not transmit the response message (step 510) may be more proper. However, transmitting the response message (step 510) by the communication 300 may be proper in some cases, and the response message (step 510) may be transmitted only when a problem is generated, or may be transmitted after receiving a predetermined number or more of the message (step 500).

When the fourth exemplary embodiment is performed according to the signal flow shown in FIG. 5B, the radio access point 120 may transmit the message (step 515) including the channel information and/or other necessary information to the communication element 300. The message (step 515) may include at least one of time information, RS measurement information and data transmission state information of the UE 100.

The time information may include at least one of a system frame number, a subframe number, a reference time and an absolute time. Although the radio access points 120 transmit information with respect to the same time or the same time zone, when connection states between a plurality of the radio access points 120 and the communication element 300 are different from each other, a time when the information is transferred to the communication element 300 may be different. Thus, it may be necessary for the radio access point 120 to transmit the time information to the communication element 300. The communication element 300 may analogize a time index of the message (step 515) transmitted from the radio access point 120 by combining the time setting information received in the first exemplary embodiment and the time information received in the present exemplary embodiment.

The RS measurement information may include at least a portion of the following.

The SRS information measured by the radio access point 120 or the subsystem of the radio access point 120;

The CSI feedback information measured by the UE 100 served by the radio access point 120 or the subsystem of the radio access point 120;

The CRS feedback information measured by the UE 100 served by the radio access point 120 or the subsystem of the radio access point 120;

The Reference Signal Received Power (RSRP) report information of the CSI-RS measured by the UEs 100 served by the radio access point 120 or the subsystem of the radio access point 120; and The RSRP report information of the CRS measured by the UEs 100 served by the radio access point 120 or the subsystem of the radio access point 120.

At this time, at least one of the ID of the radio access point 120, an ID of the subsystem of the radio access point 120 and the ID of the UE 100 may be included in the message (step 515) as necessary. The information may be information generated by utilizing the information transmitted from the UE 100 or the information measured by the radio access point 120. According to a changed example, the information may be information generated by changing the information transmitted from the UE 100 or the information measured by the radio access point 120.

In order to identify a channel characteristic of the UE 100 served by the plurality of radio access points 120, the communication element 300 may combine and utilize at least one of the RS information transferred in the present exemplary embodiment, the RS setting information and the IMR setting information received through the first exemplary embodiment. Of course, the channel characteristic may also be sensed by using the RS setting information or the IMR setting information obtained through a path except for the paths described in the first exemplary embodiment.

The data transmission state information of the UE 100 may mean information for estimating, calculating and/or guessing how much data is transmitted to the UE 100 or how much data is received from the UE 100 during a certain time. That is, the data transmission state information of the UE 100 may mean a value having a positive correlation with a data amount transmitted to the UE 100 or a data amount received from the UE 100 during the certain time.

The data transmission state information of the UE 100 may mean the information or a user perceived throughput for estimating, calculating and/or guessing the amount of the data transmitted from the UE 100 or the amount of the data transmitted to the UE 100. That is, the data transmission state information of the UE 100 may mean the value having the positive correlation with the data amount transmitted from the UE 100 or the data amount transmitted to the UE 100. According to an implementation, the "value having the positive correlation" described in this paragraph may be related with a "value having a negative correlation". The message (step 515) described above may be transferred through at least one of a load indication process and a resource status reporting process.

When the message (step 515) is transferred through the resource status reporting process, a resource status reporting initiation process may be performed in advance. The resource status reporting initiation process may be performed according to the signal flow shown in FIG. 5C. In the resource status reporting initiation process, the communication element 300 may transmit a resource status request message (step 520).

At this time, the communication element 300 may indicate the information (e.g. an RSRP measurement result), a report of which the communication element wants to receive, in the resource status request message. This message may include reporting period information, together with the information, the report of which the communication element wants to receive. The period information may have various values: this value may indicate a specific period value (e.g. 120 ms) or may indicate a value (e.g. no periodicity, event triggered and the like) which informs that the specific period is not indicated. When the specific period is not indicated, a period may not be transferred simply. The radio access point may transmit a response message in response to the resource status request message (step 530).

In the resource status reporting initiation process, when the specific period value is not transferred to the radio access point 120, the radio access point 120 may transmit the message (step 515) including the channel information and/or other necessary information too frequently. This may incur an overload of the communication element 300 or a transmission resource loss. In order to prevent this, the radio access point 120 may set a minimum time interval between transmissions of successive two measurement reporting messages (step 515). The time interval value may be an implemented value set according to the radio access point 120, or may be a value set to the radio access point 120 commonly and/or in a standard way. The value may be several ms to several hundred ms. The time interval value may be a value transferred from the communication element 300. In this case, the communication element 300 may transfer a timer (e.g. an inhibition timer) through the resource status request message. In order to maintain the minimum time interval between the transmissions of the two successive measurement reporting messages (step 515), the radio access point 120 may transmit one measurement reporting message (step 515), operate the timer, and transmit another measurement reporting message (step 515) when the timer is expired, regardless of whether the interval value is the value set to the radio access point or a value received from the communication element 300.

The radio access point 120 may transmit the information with respect to the UE 100 through the present exemplary embodiment, and the targeted UE 100 at this time may be the UE 100 to be scheduled soon. At this time, the radio access point 120 may select the targeted UE 100 based on the UE context information described in the third exemplary embodiment. For example, the UE 100 identified as the CSG subscriber may be targeted more frequently than the UE not identified as the CSG subscriber. As another example, the radio access point 120 may select the targeted UE 100 based on the bearer information of the UE. The radio access point 120 may control the UE so that the UE having the specific QCI is targeted more frequently based on the bearer information. In the exemplary embodiments, the bearer information may include the QCI, ARP and GBR QoS information.

This may be applied to context information of another UE, and for example, may be applied to the UE-AMBR.

When the fourth exemplary embodiment is performed according to the signal flow shown in FIG. 5A, the message (step 500) may be described similarly to the message (step 515) described in the present exemplary embodiment. In addition, the communication element 300 may transmit the message (step 510) informing of the reception from the radio access point 120 without problems or the generation of the problem as the response.

Table 2 shows an example of the message (step 515 or step 500) according to the forth exemplary embodiment of the present specification. A whole or a portion of the IE shown in the following table 2 may be changed or may not be transferred.

TABLE 2

| IE/Group Name | Range | Remark |
|---|---|---|
| Message Type | | |
| Global eNB ID | | |
| Time Index | | INTEGER |
| Served Cells | 0 ... <maxCellineNB> | |
| >Cell Identity | | ECGI or PCI |
| >UE Information | 0 ... <maxnoofUEsinaCell> | |
| >>UE ID | | C-RNTI, eNB UE X2AP ID, eNB UE {New Interface Protocol Stack} ID and/orOther proper UE ID |
| >>DL Data Amount Transmitted During a Certain Period | | |
| >>DL Buffer Status | | |
| >>CSI Reporting Information | | |
| >>>CSI-RS NZP Reporting Information | 0 ... <maxCSI-RS-NZP> | |
| >>>>CSI-RS NZP Configuration ID | | CSI-RS-ConfigNZPId |
| >>>>Resource Configuration | | resourceConfig |
| >>>>Subframe Configuration | | subframeConfig |
| >>>>CSI Reporting | | CQI, PMI and/or RI |
| >>>CSI IM Reporting Information | 0 ... <maxCSI-IM> | |
| >>>>CSI-IM Configuration ID | | CSI-IM-ConfigId |
| >>>>Resource Configuration | | resourceConfig |
| >>>>Subframe Configuration | | subframeConfig |
| >>>>CSI Reporting | | CQI, PMI and/or RI |
| >>CRS Reporting | | |

Hereinafter, the above table 2 is additionally described. The information of the UE served by each of the cells according to each of the cells (is identified the ECGI or the PCI) of the radio access point 120 may be transferred to the communication element 300. The information of the UE may include at least one of the following.

The UE ID information capable of identifying the UE;
The DL data amount received by the UE identified with the UE ID information during a predetermined period;
The DL buffer status;
The CSI reporting information;
The CRS reporting (RSRP measurement report); and
A benefit metric.

The CRS reporting may include the RSRP value with respect to at least one cell measured by the UE identified the UE ID. The (at least one) cell measured by the UE may indicate a cell (is identified the ECGI or the PCI) serving the UE or at least one of neighbor cells. The above description may be applied to a general channel information transfer in addition to the case wherein the message as noted in table 2 is transferred.

For example, among the listed information, a method of transmitting the UE ID information and the RSRP measurement report may be performed as noted table 3 below. According to table 3, a list of the RSRP measurement report may include at least one RSRP measurement report item. The RSRP measurement report item may include the UE ID which informs which US the information of the item corresponds to, and may include a result of the RSRP of the serving cell and the neighbor cell measured by the UE. The measured RSRP may be transferred along with the ID of the cell which is an object of the measurement.

TABLE 3

| IE/Group Name | Presence | Range | Remark |
|---|---|---|---|
| RSRP Measurement Report Item | | 1 ... <Maximum UE Measurement Report Number> | |
| >UE ID | Necessariness | | ID of UE servied by trnasmitting side. IT may correspond to one of C-RNTI and/or eNB UE X2AP ID. |
| >RSRP Measurement Result | | {1 or 0} ... 9 | |
| >> Cell ID | Necessariness | | ECGI. Cell which is an Object of the |

TABLE 3-continued

| IE/Group Name | Presence | Range | Remark |
|---|---|---|---|
| >>Measured RSRP | Necessariness | | Measured RSRP. INTEGER (0 . . . 97, . . .) |

Transmitting the RSRP measurement result of all UEs served by the radio access point 120 whenever the message (step 515 or step 510) is transferred to the communication element 300 is ideal. This is because an indirect situation of the all UEs included in the radio access point 120 may be estimated. But, since time points when the RSRP measurement results are transferred from the UEs to the radio access point 120 may be different, the RSRP measurement results of the all UEs are not always renewed whenever the radio access point 120 transmits the message to the communication element 300. In addition, there may be a UE of which a change of the RSRP measurement result is not large. Although such a case is generated, transmitting the RSRP measurement result of the all cells including the RSRP measurement result of the UE of which the RSRP measurement result is not changed or is not almost changed may be one method. But, repeatedly transmitting the RSRP measurement result of the UE of which the RSRP measurement result is not changed or is slightly changed may incur the signaling loss. Thus, a method of transmitting only the RSRP measurement result of the UE of which the RSRP measurement result is changed and/or the change of the RSRP measurement result is equal to or larger than a predetermined level may be performed. The above-mentioned two methods (the method of transmitting the RSRP measurement result of the all UEs and the method of transmitting the RSRP measurement result of the partial UE) of transmitting the RSRP measurement result of the UE are described in more detail.

When the RSRP measurement result of the all UEs is transmitted through the message (step 515 or step 510), the UE ID may be omitted. Because it is not necessary to track the RSRP measurement result of each of the UEs, the communication element 300 may use the RSRP measurement result in the cooperation or the resource systematization between the radio access points by considering the RSRP measurement report list most recently received. That is, the radio access point 120 has a responsibility of transmitting the RSRP measurement result of the all cells served by the radio access point 120 to the communication element 300. Meanwhile, the UE ID may be necessary because the cooperation or the resource systematization is performed by tracking the RSRP measurement result of the UE according to an algorithm of the communication element 300.

When the RSRP measurement result is transmitted, the UE ID may be necessary so as to connect to the CSI reporting information. Although a message sending the RSRP measurement result and a message sending the CSI reporting information are defined as the same message (e.g., resource status update message), the RSRP measurement result and the CSI reporting information of one UE may not always be included in one message to be transferred. When the UE ID is not sent, the RSRP measurement result and the CSI reporting information are not connected based on the UE. The RSRP measurement result is long term channel information of the UE and the CSI reporting information is short term channel information of the UE. Therefore, connecting and storing the two pieces of information with respect to the UE by the communication element 300 is more helpful in generating coordination information which improves whole network performance. The generation of the coordination information will be described in more detail in a fifth embodiment. Thus, when the RSRP measurement result is transferred, the UE ID may be transferred. The communication element 300 may store the RSRP measurement result according to each UE identified by the UE ID. When the RSRP measurement result with respect to a corresponding UE is already stored, the already stored RSRP measurement result may be replaced with a newly received RSRP measurement result. In the same manner, with regard to the CSI information, the communication element 300 may store the CSI information according to each UE identified by the UE ID. When the CSI measurement result with respect to a corresponding UE is already stored, the already stored CSI measurement result may be replaced with newly received CSI measurement result.

The communication element 300 receiving the RSRP measurement result may replace an existing RSRP measurement result with a newly received RSRP measurement result, when there is the existing RSRP measurement result received from a corresponding cell. The communication element 300 may store the received RSRP measurement result when the RSRP measurement result with respect to the corresponding cell has not been stored.

When the RSRP measurement result of the partial UE, for example, the RSRP measurement result of the UE of which the RSRP measurement result is changed and/or the change of the RSRP measurement result is equal to or larger than the predetermined level is transmitted through the message (step 515 or step 510), the communication element 300 may replace the existing RSRP measurement result with the newly received RSRP measurement result with respect to the UE of which the UE ID is equal to the UE ID. When there is no existing RSRP measurement result, the newly received RSRP measurement result of the UE may be stored. Therefore, in a case in which the UE had been served by the radio access point 120 and is not being currently served because of a hand over and the like, the RSRP measurement result is not continuously transferred to the communication element 300, and thus the communication element 300 may perform the cooperation or the resource systematization function between the radio access points while determining that an old RSRP measurement result of the UE is continuously valid (i.e. using wrong information). In order to resolve the above-mentioned problem, the radio access point 120 may inform that the UE is not valid in the radio access point 120 to the communication element 300 by using at least one of the following methods.

Specifically form the RSRP measurement result; and
    Include an indicator which informs that the UE is not valid in the radio access point 120, in the RSRP measurement report item.

The method of specifically forming the RSRP measurement result may correspond to at least one of a method of not transmitting the RSRP measurement result (i.e. only the UE ID is transmitted to the RSRP measurement report item, that is, it corresponds to 'Range 0' of the RSRP measurement result), a method of setting the RSRP with respect to at least one specific cell or all cells, for example, the serving cell, in RSRP measurement result, as 0, and other methods appointed between the radio access point 120 and the communication element 300. The communication element 300 which knows that the UE is not valid in the radio access point 120 any more, may cancel the RSRP measurement result of the UE and may not consider the RSRP measurement result in the cooperation or the resource systematization between the radio access points.

Although the communication element 300 does not recognize that the UE is not valid in the radio access point 120, there may be methods for resolving the problem through an implementation in the radio access point 120. A method of assigning the ID, which had been assigned to the nonvalidated UE, to a newly valid UE as soon as possible is one of the methods. But, this method is not a method totally resolving the problem.

When the radio access point 120 transmits the CSI reporting information, the CSI reporting information may include at least one of a sub-band Channel Quality Indicator (CQI), a wideband CQI and a Rank Indicator (RI). The sub-band CQI may be transferred according to each cell; each subframe; each UE; each CSI process; and each sub-band. The wideband CQI and/or the RI may be transferred according to the each cell; each subframe; each UE; and each CSI process. When a sequence of the subframe and/or the sub-band means a subframe number and/or a sub-band number, the subframe number and/or the sub-band number may not be transmitted. For example, firstly configured subframe information may correspond to a subframe #0. In contrast, it is difficult to sequentially transmit the UE and/or CSI process, and thus it may be necessary to transfer the UE ID and/or a CSI process index. Thus, when the radio access point 120 transmits the CSI reporting information, the radio access point 120 may transfer the corresponding UE ID and/or the CSI process index. Setting information of a plurality of CSI processes according to each of the cells and the CSI process index may be set in the communication element 300 through a method such as an OAM, and the like. Therefore, when the CSI reporting information is transmitted to the communication element 300 in each CSI process of the UE, the communication element 300 may be informed of which CSI process setting corresponds to the transmitted CSI reporting information, by simply transmitting the CSI process index without a necessity of transmitting setting information of the CSI process. For example, when the setting information and the index of the 32 CSI processes with respect to a cell A are set in the communication element 300, the CSI process setting information corresponding to CSI process index Nos. 3, 12, 27 and 29 is configured in a UE X served by the cell A, and the CSI reporting information measured by the UE X with respect to the four CSI processes is received and transmitted to the communication element 300 again, only the CSI process index and the CSI reporting information are transmitted to the communication element 300 without the necessity of transmitting the CSI process setting information corresponding to the CSI process index Nos. 3, 12, 26 and 29, and thus the communication element 300 may recognize the setting information corresponding to each CSI process.

The communication element 300 may store the transferred channel information of the UE 100 and other necessary information, and use the channel information and the necessary information in the cooperation or resource systematization between the radio access points. For example, the communication element 300 may use the RSRP measurement report and/or the CSI information, when the communication element performs at least one of generating the coordination information and the validating suitability of the coordination information.

Next, a fifth exemplary embodiment of the present specification is described.

According to the fifth exemplary embodiment of the present specification, cooperation information to be used in the cooperation between the radio access points 120 may be generated based on information which may be used by the communication element 300. The information which may be used by the communication element 300 may include at least a portion of the following information.

The RS setting information (which may be received through the first exemplary embodiment);

The IMR setting information (which may be received through the first exemplary embodiment);

The UL-DL configuration information (which may be received through the first exemplary embodiment and/or the second exemplary embodiment);

The UE context (which may be received through the third exemplary embodiment);

The RS measurement information (which may be received through the fourth exemplary embodiment);

The data transmission state information of the UE 100 (which may be received through the fourth exemplary embodiment); and The benefit metric (which may be received through the fourth exemplary embodiment).

The communication element 300 may generate the information to be used in the cooperation between the radio access points by using at least one method. The set of the radio access points to be cooperated may be determined according to the second exemplary embodiment of the present specification. Hereinafter, the present exemplary embodiment is described based on an example wherein the cooperation information to be used in the cooperation between the radio access points 120 is generated based on the information which may be used by the communication element 300.

The cooperation (hypothetical) information may include information on which level of transmission or reception power situation in relation to each serving UE is selected by the radio access point 120 and other radio access points adjacent to the radio access point 120. The transmission or reception power situation may be controlled with various values, however, a situation wherein transmission or reception power is turned on or off will be considered, for convenience. In this case, the cooperation information may mean a blanking pattern of the radio access points. The coordination information may further include a benefit metric, which informs that which obtain is expected when a corresponding blacking pattern is applied.

The communication element 300 may determine the blanking pattern of the each radio access point 120 by using at least one of the ABS information and the RNPT information. For example, when at least one of the ABS information and the RNTP information of one radio access point 120 enables data to be transmitted with a low power with respect to at least one of the specific subframe and the PBR, the communication element 300 may form the blanking pattern so as to transmit the resource in a turned off power or a low power.

When the blanking pattern is determined, a throughput (i.e. a changed performance indicator) which may be obtained by the following processes (1 to 3) may be considered.

1. The communication element 300 may calculate the throughput anticipated with respect to the UEs served by the radio access point 120 according to various transmission or reception power situations between the radio access points adjacent to the radio access point and the UE served by the adjacent radio access points, by using at least one of the RS setting information, the IMR setting information and the RS measurement information of the radio access point 120. The transmission or reception power situation may be controlled with various values, however, the situation wherein transmission or reception power is turned on or off will be considered, for convenience. That is, the communication element 300 may calculate anticipated throughput of the UEs served by the radio access point 120 according to the various blanking patterns of the adjacent radio access points by using the information of the radio access point 120. The higher the throughput may be, the more adjacent radio access points stop transmission and reception, because the interference is decreased.

2. The communication element 300 may revise the throughput of the various blanking patterns calculated with respect to each of the UEs 100 in the above step, in additional manner. For example, when the revised value is referred to as throughput', in a case wherein there are much data transmitted from the UE 100 or received to the UE 100 in advance, the throughput' may be lower than that of the UE from which not much data are transmitted or to which not much data are received, in consideration of fairness. In addition, the throughput of the UE with respect to the blanking pattern of which the transmission and reception is stopped by the many adjacent radio access points may be obtained by a sacrifice of the resource of other radio access points, and thus the throughput' of the blanking pattern of which the transmission and reception is stopped may be lower than that of the blanking pattern of which the transmission and reception is not stopped.

3. When the throughput' is calculated, the information received in the third exemplary embodiment may be used. For example, the UE identified as the CSG subscriber may be controlled to have larger throughput' than that of the UE not identified as the CSG subscriber. As another example, the communication element 300 may control the UE having the specific QCI so that the UE has larger throughput' based on the bearer information of the UE (e.g. the QCI, the ARP, GBR QoS information). This may be applied to the context information (e.g. the UE-AMBR) of another UE.

The communication element 300 may find the blanking pattern maximizing a total of the throughput' with respect to the UE(s) of each radio access point obtained such a manner.

Next, a sixth exemplary embodiment of the present specification is described.

According to the sixth exemplary embodiment of the present specification, the communication element 300 may transfer the cooperation information to the radio access point 120. The cooperation information may be the information generated according to the fifth exemplary embodiment. The sixth exemplary embodiment may be implemented with the signal flow shown in FIG. 5D or FIG. 5C.

When the sixth exemplary embodiment is implemented with the signal flow shown in FIG. 5D, the communication element 300 may transfer at least one of the time information, the cooperation information and the SRS information measured by another radio access point to the radio access point 120 through the message (step 525). The message used at this time may be a load information message.

The time information may include at least one of the system frame number, the subframe number, the reference time and the absolute time. Although the communication element 300 transmits information with respect to the same time or the same time zone, when connection states between a plurality of the radio access points 120 and the communication element 300 are different from each other, a time when the information is transferred to the radio access point 120 may be different. Thus, it may be necessary for the communication element 300 to transmit the time information to the radio access point 120. The radio access point 120 may determine when the cooperation information is applied based on the time information.

The cooperation information may be separately provided according to the each radio access point 120, or the each subsystem of the radio access point 120, or the each UE 100. When the cooperation information is transferred separately with respect to the each subsystem of the radio access point 120, the cooperation information of the subsystem included in another radio access point in addition to the subsystem included in the radio access point 120 may be transferred. In addition, the cooperation information may be provided in a sequence of numbers type or a character string type with respect to at least one subframe. Each element of the sequence of numbers or the character string may have two kinds of values (e.g. 0 or 1), and may have a value more segmentalized than the two kinds of values. The each element of the sequence of numbers or the character string may indicate the PRB or a Resource Block Group (RBG). The cooperation information may be transferred in the existing RNTP IE type or a type in which the RNTP IE is applied.

When the subsystem of the radio access point 120 is the TDD cell, the communication element 300 may transmit only the cooperation information corresponding to the DL by using the UL-DL configuration information (may be obtained through the first exemplary embodiment and/or the second exemplary embodiment) of the corresponding cell, and the radio access point 120 may sequentially apply the received cooperation information to the DL subframe. Alternatively, the communication element 310 does not consider this and transmits the cooperation information, and the radio access point 120 may personally use only cooperation information corresponding to the DL subframe in scheduling of the DL subframe (i.e. the cooperation information not corresponding to the DL subframe is ignored). For example, when the radio access point 120 selects No. 3 as the UL-DL configuration, the DL transmission is performed in 0th, 5th, 6th, 7th, 8th and 9th subframes, when the cooperation information corresponding to 10 subframes are received from the communication element 300, the cooperation information corresponding to 6 subframes from the front may be sequentially used in scheduling for the DL transmission in 0th, 5th, 6th, 7th, 8th and 9th subframes, respectively (remaining cooperation information may be applied to a next system frame); or the cooperation information corresponding to 1st, 6th, 7th, 8th, 9th and 10th subframes among the cooperation information corresponding to 10 subframes received from the communication element 300 may be used in scheduling for the DL transmission in 0th, 5th, 6th, 7th, 8th and 9th subframes, respectively (the remaining cooperation information (the cooperation information corresponding to 2nd, 3rd, 4th and 5th subframes) may be disregarded). For reference, the above-mentioned handle is necessary because an object of the cooperation or the resource systematization between the radio access points is limited to the DL transmission. As described in the second exemplary embodiment, in a situation wherein the UL-DL configuration may be frequently changed, the communication element 300 may not recognize the situation. In this case, the latter method (i.e. the method wherein the communication element 300 transmits the cooperation information while not considering which subframe corresponds to the DL, and the radio access point 120 personally uses the only cooperation information corresponding to the DL subframe in scheduling of the DL subframe) may be properly used.

More detailed resource cooperation or scheduling may be generated additionally inside of the radio access point 120, and thus the cooperation information of another radio access point may be provided to the radio access point 120. For example, when any UE 100 served by the radio access point 120 receives a large interference from a radio access point A, the radio access point A may not perform a scheduling of the UE 100 with respect to a time and a frequency assigned in relation to the radio access point A, or may consider lowering a priority of the scheduling of the UE 100 with respect to the corresponding time and the corresponding frequency.

When the RS used for cooperation between the radio access points is the SRS, it may be difficult to foresee an indirect situation of the UE 100 included in the radio access point 120 by referring to only an SRS strength measured in the one radio access point 120. Thus, in this case, the communication element 300 may transfer the SRS information measured by another radio access point 120 to the radio access point 120.

The cooperation information may be transferred along with the benefit metric. Here, the benefit metric is a value indicating an expected level of a benefit (in a whole cluster, in a transmitting entity and/or receiving entity), according to the cooperation information. The radio access point 120 receiving the benefit metric may determine whether the radio access point 120 follows the cooperation information. Finally, the benefit metric is also information which may be considered in scheduling of the radio access point 120 along with the cooperation information.

The communication element 300 may induct or instruct at least one of operations of the radio access point 120 by setting the benefit metric value as a specific value.

The radio access point 120 follows the cooperation information (corresponding to the oneself);

The radio access point 120 transmits measurement information (e.g. a resource assignment hypothesis, the benefit metric according to the resource assignment hypothesis and/or RSRP measurement report list) with respect to the radio access point 120;

The radio access point 120 disregards the benefit metric; and

Other operations needed in the cooperation or the resource systematization between the radio access points.

For example, a method of setting the benefit metric value as the specific value may correspond to a setting the benefit metric value as 0. Alternatively, the communication element 300 may transmit an additional indicator with respect to each of the operations.

When the sixth exemplary embodiment is performed according to the signal flow shown in FIG. 5C, the message (step 520) may be described similarly to the message (step 535) described in the present exemplary embodiment. In addition, the radio access point 120 may transmit the message (step 530) informing of the reception from the communication element 300 without problems or the generation of the problem as the response to the communication element 300.

FIG. 7 is a flowchart illustrating a handover process according to a seventh exemplary embodiment of the present specification.

Next, the seventh exemplary embodiment of the present specification is described.

According to the seventh exemplary embodiment of the present specification, the communication element 300 may control a load between radio access points 120 based on the channel information of the UE 100 received from the radio access point 120.

The communication element 300 may include the channel information of the UE (e.g. the UE 100) served by the plurality of radio access points 120a and 120b. The channel information may be obtained through the fourth exemplary embodiment of the present specification.

The communication element 300 may transmit a message related to a load balance and/or a mobility parameter adjustment to the radio access point 120a in step 710. The message (step 710) may include at least one of the UE ID, the radio access point ID, a UE-specific mobility parameter adjustment value, and a UE group-specific mobility parameter adjustment value. The mobility parameter adjustment value may include a difference value and/or an absolute value with respect to a current mobility parameter value. The UE group may be expressed through a group characteristic. For example, in order to adjust the mobility parameter of the UE group to which a Cell Range Expansion (CRE) is applied, a mobility parameter adjustment value for the CRE may be transferred.

The communication element 300 may obtain a Precoding Matrix Indicator (PMI), a Rank Indicator (RI) and/or a Channel Quality Indicator (CQI) of the plurality of UEs. This may be included in the CSI feedback information transferred through the fourth exemplary embodiment. When a portion or a whole of the CSI feedback information is used, an approximate location, a direction, a moving direction, and the like of the UE may be estimated. Therefore, a load adjustment wherein the UE-specific and/or the UE group-specific characteristic are considered may be performed rather than a load adjustment wherein a situation of the UE currently served by the radio access point is not considered.

The radio access point 120a may hand the UE 100 served by the radio access point 120a over to the radio access point 120b in step 720. When the UE 100 is handed over, the radio access point 120 may prevent a ping pong phenomenon wherein the UE 100 repeatedly moves between the radio access points by transferring a proper handover cause indicator to the radio access point 120b. For example, when the handover is performed by the load adjustment process described above, the radio access point 120a may transfer the indicator instructing a 'load adjustment cause' to the radio access point 120b. In this case, the radio access point 120b may differently set a condition for determining the handover from the radio access point 120b to the radio access point 120a with reference to a corresponding indicator.

The message (step 710) may enable the specific UE 100 or the specific UE group served by the radio access point 120a to be handed over to the radio access point 120b. The radio access point 120b and the communication element 300 may mean substantially the same object (or element, or device).

FIG. 9 is a block diagram illustrating the UE 100 according to at least a portion of an exemplary embodiment of the present specification.

Referring to FIG. 9, the UE 100 may include a communication unit 910 and a control unit 920.

The communication unit 910 performs a signal transmission or reception of the UE 100 necessary to perform at least one of the exemplary embodiments described above. The control unit 920 controls each configuration unit of the UE 100 in order to perform at least one of the exemplary embodiments described above.

FIG. 10 is a block diagram illustrating the radio access point 120 according to at least a portion of an exemplary embodiment of the present specification.

The communication unit 1010 performs a signal transmission or reception of the radio access point 120 necessary to perform at least one of the exemplary embodiments described above. The control unit 1020 controls each configuration unit of the radio access point 120 in order to perform at least one of the exemplary embodiments described above.

FIG. 11 is a block diagram illustrating the communication element 300 according to at least a portion of an exemplary embodiment of the present specification.

The communication unit 1110 performs a signal transmission or reception of the communication element 300 necessary to perform at least one of the exemplary embodiments described above. The control unit 1120 controls each configuration unit of the communication element 300 in order to perform at least one of the exemplary embodiments described above.

The information included in the message used in the process described through at least a portion of the exemplary embodiments may be included in a message used in another proper process or a new process. Alternatively, the information included in the message used in the process described through the exemplary embodiment described above may be transferred between the radio access point 120 and the communication element 300 without an additional defined process. For example, the RS information transferred from the radio access point 120 to the communication element 300 in the setup process may also be transferred through another process. The above-mentioned another process may not be the process defined in the present specification.

In the exemplary embodiments described above, all of the steps and messages may be selectively performed or may be omitted. In addition, the steps in the each exemplary embodiment may not be sequentially performed, and a sequence of the steps may be changed. The message transfer may also not be sequentially performed, and a sequence of the message transfer may be changed.

The communication element 300 used in the present specification may indicate another element in the each exemplary embodiment. For example, the communication element 300 of the first exemplary embodiment may be the radio access point 120, and the communication element 300 of the sixth exemplary embodiment may be the OAM.

INDUSTRIAL APPLICABILITY

Meanwhile, the exemplary embodiments disclosed in the specification and drawings are merely presented to easily describe technical contents of the present disclosure and help the understanding of the present disclosure and are not intended to limit the scope of the present disclosure. That is, it is obvious to those skilled in the art to which the present invention belongs that different modifications can be achieved based on the technical spirit of the present invention.

The invention claimed is:

1. A method for coordinated multipoint (CoMP) communication by a first base station, comprising:
   transmitting, to a second base station, a message including a reference signal received power (RSRP) measurement report of a terminal and a channel state information (CSI) report of the terminal, wherein the RSRP measurement report comprises identification of at least one of a serving cell that serves the terminal, on which a RSRP is measured, or a neighbor cell of the serving cell, on which the RSRP is measured; and
   receiving, from the second base station, coordination information which is determined based on the RSRP measurement report and the CSI report at the second base station,
   wherein the coordination information includes a resource assignment hypothesis for the CoMP communication and a benefit metric associated with the resource assignment hypothesis, wherein the benefit metric includes a value indicating an expected level of a benefit obtained by adopting the resource assignment hypothesis for the CoMP communication.

2. The method of claim 1, wherein the benefit metric is validated based on the RSRP measurement report and the CSI report by the second base station.

3. The method of claim 1, wherein the benefit metric is disregarded by the first base station if the benefit metric includes a predetermined value.

4. A method for coordinated multipoint (CoMP) communication by a second base station, comprising:
   receiving, from a first base station, a message including a reference signal received power (RSRP) measurement report of a terminal and a channel state information (CSI) report of the terminal, wherein the RSRP measurement report comprises identification of at least one of a serving cell that serves the terminal, on which a RSRP is measured, or a neighbor cell of the serving cell, on which the RSRP is measured;
   determining coordination information based on the RSRP measurement report and the CSI report; and
   transmitting, to the first base station, the determined coordination information,
   wherein the coordination information includes a resource assignment hypothesis for the CoMP communication and a benefit metric associated with the resource assignment hypothesis, wherein the benefit metric includes a value indicating an expected level of a benefit obtained by adopting the resource assignment hypothesis for the CoMP communication.

5. The method of claim 4, further comprising:
   validating the coordination information based on the RSRP measurement report and the CSI report.

6. The method of claim 4, wherein the benefit metric includes a predetermined value indicating disregard for the benefit metric.

7. A first base station for coordinated multipoint (CoMP) communication, comprising:
   a transceiver for transmitting and receiving a signal; and
   a controller is configured to:
      transmit, to a second base station, a message including a reference signal received power (RSRP) measurement report of a terminal and a channel state information (CSI) report of the terminal, wherein the RSRP measurement report comprises identification of at least one of a serving cell that serves the terminal, on which a RSRP is measured, or a neighbor cell of the serving cell, on which the RSRP is measured,
      receive, from the second base station, coordination information which is determined based on the RSRP measurement report and the CSI report at the second base station, and
      transmit, to the terminal, a data based on the coordination information,
   wherein the coordination information includes a resource assignment hypothesis for the CoMP communication and a benefit metric associated with the resource assignment hypothesis, wherein the benefit metric includes a value indicating an expected level of a benefit obtained by adopting the resource assignment hypothesis for the CoMP communication.

8. The first base station of claim 7, wherein the benefit metric is validated based on the RSRP measurement report and the CSI report by the second base station.

9. The first base station of claim 7, wherein the benefit metric is disregarded by the first base station if the benefit metric includes a predetermined value.

10. A second base station for coordinated multipoint (CoMP) communication, comprising:
   a transceiver for transmitting and receiving a signal; and
   a controller is configured to:
      receive, from a first base station, a message including a reference signal received power (RSRP) measurement report of a terminal and a channel state information (CSI) report of the terminal, wherein the RSRP measurement report comprises identification of at least one of a serving cell that serves the terminal, on which a RSRP is measured, or a neighbor cell of the serving cell, on which the RSRP is measured,
      determine coordination information based on the RSRP measurement report and the CSI report, and
      transmit, to the first base station, the determined coordination information,
   wherein the coordination information includes a resource assignment hypothesis for the CoMP communication and a benefit metric associated with the resource assignment hypothesis, wherein the benefit metric includes a value indicating an expected level of a benefit obtained by adopting the resource assignment hypothesis for the CoMP communication.

11. The second base station of claim 10, wherein the controller is further configured to validate the coordination information based on the RSRP measurement report and the CSI report.

12. The second base station of claim 10, wherein the benefit metric includes a predetermined value indicating disregard for the benefit metric.

* * * * *